United States Patent [19]

Kitaura et al.

[11] Patent Number: 5,052,090
[45] Date of Patent: Oct. 1, 1991

[54] FLANGE UNIT FOR A PHOTOCONDUCTOR DRUM AND PHOTOCONDUCTOR DRUM UNIT

[75] Inventors: Katsuya Kitaura, Ibaraki; Masaru Okamoto, Hirakata, both of Japan

[73] Assignee: Mita Industrial Co., Ltd., Osaka, Japan

[21] Appl. No.: 550,846

[22] Filed: Jul. 10, 1990

[30] Foreign Application Priority Data

Jul. 11, 1989 [JP] Japan .................. 1-82022[U]

[51] Int. Cl.⁵ .................................. B21B 31/08
[52] U.S. Cl. .................... 29/123; 29/129.5; 355/211; 355/213
[58] Field of Search ............ 29/123, 129.5; 355/211, 355/213

[56] References Cited

U.S. PATENT DOCUMENTS

| | | | |
|---|---|---|---|
| 732,907 | 7/1903 | Storr | 29/123 |
| 1,043,173 | 11/1912 | Friestedt | 29/123 |
| 2,072,642 | 3/1937 | Martin | 29/123 |
| 2,368,450 | 1/1945 | Crooks | 29/123 |
| 4,040,158 | 8/1977 | Payne | 29/129.5 |

Primary Examiner—P. W. Echols
Assistant Examiner—David P. Bryant
Attorney, Agent, or Firm—Armstrong, Nikaido, Marmelstein, Kubovcik & Murray

[57] ABSTRACT

A flange for a drum is disclosed. The flange is mounted on one end of the drum to rotate together with it, and comprises a hole passing therethrough along the axis of rotation to receive a rotation shaft therethrough, so that the flange can rotate together with the rotation shaft. The hole comprises an inside portion having an oblong cross section and an outside portion having a perfectly circular cross section, the inside portion being located toward the drum, and the outside portion being open toward the outside. One end portion of the rotation shaft has an oblong cross section and is securely fitted in the oblong portion of the hole. When the drum is to be tested for concentricity with the rotation shaft, a conical rotation pin is inserted into the circular portion of the hole so that the flange can be rotated concentrically with, and together with the conical rotation pin.

6 Claims, 4 Drawing Sheets

FLANGE UNIT FOR A PHOTOCONDUCTOR DRUM AND PHOTOCONDUCTOR DRUM UNIT

BACKGROUND OF THE INVENTION

1. Field of the invention

The present invention relates to a flange which is mounted on one end of a drum such as a photoconductor drum used in an image forming apparatus such as an electrophotographic copying machine or the like, and more particularly to a flange for a drum, which is mounted on a prescribed rotation shaft so as to rotate together with the rotation shaft, thereby transmitting the rotation of the shaft to the drum.

2. Description of the prior art

In an image forming apparatus such as an electrophotographic copying machine or the like, an image is formed using a photoconductor drum having a photoconductive layer on the outer circumferential surface thereof. The photoconductor drum is rotatably mounted inside the image forming apparatus. As the photoconductor drum rotates, a latent image is formed and developed into a visible image on the photoconductive layer of the photoconductor drum.

As shown in FIG. 5, the photoconductor drum for an image forming apparatus usually has flanges 40 and 50 mounted on both ends thereof, respectively, the flanges 40 and 50 being capable of rotating together with the photoconductor drum. That is, the photoconductor drum 20 having the flanges 40 and 50 mounted on the ends thereof rotates together with the flanges 40 and 50. The flanges 40 and 50 are provided with holes 41 and 51 passing therethrough, respectively, along the axis of rotation. The ends of a rotation shaft 30 are respectively inserted through the holes 41 and 51. Usually, the hole formed in one of the flanges (the hole 41 of the flange 40 in FIG. 5) is perfectly circular in cross section, while the hole formed in the other flange (the hole 51 of the flange 50) has an oblong cross section with opposite rounded ends (hereinafter referred to simply as "oblong cross section"). The end portions of the rotation shaft 30 have cross sections that match those of the holes 41 and 51, respectively. That is, the end portion of the rotation shaft 30 to be inserted into the hole 41 of the flange 40 is perfectly circular in cross section, while the other end portion 31 has its sides cut off to match the oblong cross section of the hole 51 of the flange 50. When the rotation shaft 30 rotates with its side-cut end portion 31 inserted into the oblong hole 51 of the flange 50, the rotation of the rotation shaft 30 is transmitted to the flange 50 via the end portion 31, so that the flange 50 is rotated together with the rotation shaft 30, which allows the photoconductor drum 20 to rotate together with the rotation shaft 30.

In the image forming apparatus, while the photoconductor drum 20 is rotating, a latent image is formed on the photoconductive layer provided on the circumferential surface thereof, the latent image then being developed with developer into a visible image. Unless the photoconductor drum 20 is mounted with its rotation axis aligned with that of the rotation shaft 30, the photoconductor drum 20 will wobble when rotated, which may cause distortion in the latent image to be formed on the photoconductor drum 20 or may prevent the latent image from being properly developed by developer. Therefore, to produce an image of good quality, the photoconductor drum 20 must be supported concentrically with respect to the rotation shaft 30. For that purpose, it is necessary to examine whether or not the photoconductor drum 20 is concentric with the rotation shaft 30 when mounted on the rotation shaft 30 in the image forming apparatus.

However, it is difficult to measure the eccentricity of the photoconductor drum 20 for rotation after the photoconductor drum 20 has been mounted in the image forming apparatus. Furthermore, in such a measurement, if it is found that the photoconductor drum 20 is not rotating concentrically with the rotation shaft 30, the photoconductor drum 20 already mounted on the rotation shaft 30 must be removed therefrom for correction, which is time consuming and thus reduces work efficiency. Therefore, the eccentricity of the photoconductor drum 20 for rotation is usually measured by rotating the photoconductor drum 20 with the flanges 40 and 50 mounted on the ends thereof while the centers of the flanges 40 and 50 are being supported by appropriate means, but without mounting the photoconductor drum 20 in the image forming apparatus.

The eccentricity of the photoconductor drum 20 for rotation is measured in the following manner: A conical rotation pin is inserted into each of the holes 41 and 51 of the flanges 40 and 50, so that the photoconductor drum 20 is supported by the rotation pins. When the rotation pins are rotated, the rotation thereof is transmitted to the photoconductor drum 20 via the flanges 40 and 50, thereby rotating the photoconductor drum 20. A dial gauge is placed in contact with a non-image area on each end of the outer circumferential surface of the photoconductor drum 20 to measure the eccentricity of the photoconductor drum 20 for rotation.

However, as previously described, the hole 51 of the flange 50 mounted on one end of the photoconductor drum 20 has an oblong cross section which matches the cross section of the side-cut end portion 31 of the rotation shaft 30 so that the flange 50 is rotated together with the rotation shaft 30. When the conical rotation pin is inserted into the hole 51 having an oblong cross section, the flange 50 cannot be held stably with its rotation axis aligned with that of the rotation pin. Thus, there is a great possibility that the flange 50 itself wobbles about the rotation pin when rotated. This prevents the accurate measurement of the eccentricity of the photoconductor drum 20 for rotation.

SUMMARY OF THE INVENTION

The flange for a drum of this invention, which overcomes the above-discussed and numerous other disadvantages and deficiencies of the prior art, is mounted on one end of the drum to rotate together with said drum, and comprises a hole passing therethrough along the axis of rotation to receive a rotation shaft therethrough, allowing said flange to rotate together with said rotation shaft, wherein said hole comprises an inside portion having an oblong cross section and an outside portion having a perfectly circular cross section, said inside portion being located toward the drum, and said outside portion being open toward the outside.

In a preferred embodiment, the drum is a photoconductor drum for use in an image forming apparatus.

In a preferred embodiment, the outside portion of said hole with a perfectly circular cross section receives the tip portion of a conical rotation pin, thereby allowing the rotation of said conical rotation pin to be transmitted to said flange.

In a preferred embodiment, the inside portion of said hole with an oblong cross section receives one end portion of said rotation shaft therethrough to allow the rotation of said rotation shaft to be transmitted to said flange, said end portion of said rotation shaft having the same cross section as that of said inside portion.

Thus, when the flange of this invention is mounted on the drum, it surely transmits the rotation of the rotation shaft to the drum. Furthermore, with the flange mounted on the drum, the eccentricity of the drum for rotation can be accurately measured.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

The following describes an embodiment of the present invention.

Figure 1:
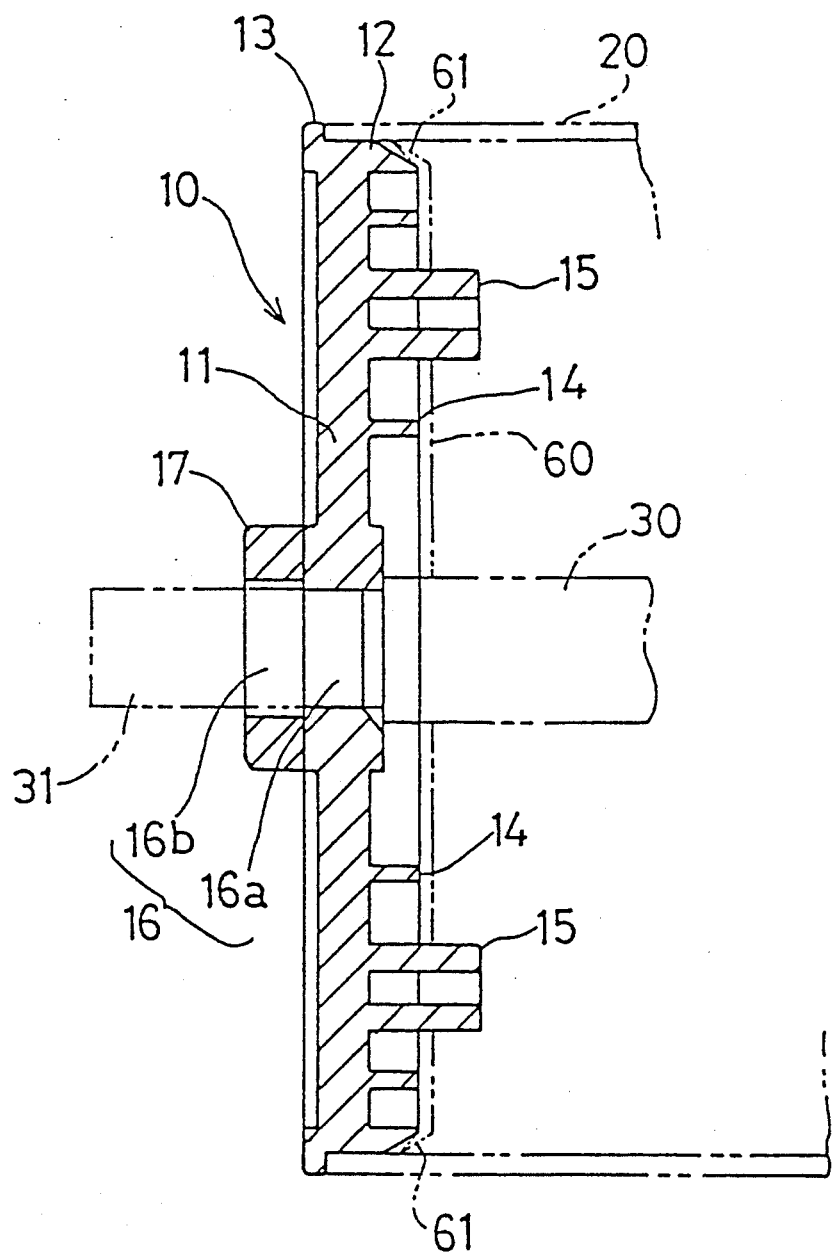
FIG. 1 is a sectional view of a flange for a drum according to the invention.

As shown in FIG. 1, a flange 10 of the present invention is fitted into, for example, one end of a photoconductor drum 20. The flange 10 has a body 11 molded from, for example, a synthetic resin in the form of a disc. The body 11 has an outer wall 12, the body 11 and the outer wall 12 being integrally formed. Part of the outer wall 12 serves as the circumference of the body 11 and the other part thereof protrudes in an annular form from one side of the body 11. The portion of the outer wall 12 on the circumference of the body 1 1 has an outer diameter approximately equal to the inner diameter of the photoconductor drum 20, so that the outer surface of the outer wall 12 tightly contacts the inner surface of the photoconductor drum 20. The protruding portion of the outer wall 12 has an outer circumferential surface tapering toward the end thereof.

On the side of the body 11 opposite from the side with the protruding portion of the outer wall 12, an abutting portion 13 is located projecting outwardly and radially from the outer wall 12. The abutting portion 13 abuts against the end of the photoconductor drum 20 when the outer wall 12 is fitted in the photoconductor drum 20.

Disposed on the surface of the body 11 at the side provided with the protruding portion of the outer wall 12 are numerous stiffening ribs 14 which are arranged in a concentric and radial manner. Also on the same surface, a plurality of support ribs 15 projecting in the same direction as that of the protruding portion of the outer wall 12 are disposed appropriately spaced apart from one another. A conductive plate 60 made of a conductive metal such as stainless steel is supported on the support ribs 15. The conductive plate 60 is electrically connected to the inner surface of the photoconductor drum 20, so that current is supplied to the photoconductor drum 20 via the conductive plate 60. On the periphery of the conductive plate 60, a plurality of engaging projections 61 projecting outwardly are disposed appropriately spaced apart from one another. The photoconductor drum 20 usually comprises an aluminum drum, the entire surface of which is appropriately processed into Alumite, and also comprises a photosensitive layer on the outer circumferential surface of the aluminum drum. When the flange 10 is mounted on the photoconductor drum 20, the engaging projections 61 of the conductive plate 60 cut into the non-conductive Alumite layer of the inner surface of the aluminum drum, thereby providing an electrical connection between the aluminum drum and the conductive plate 60.

Figure 2:
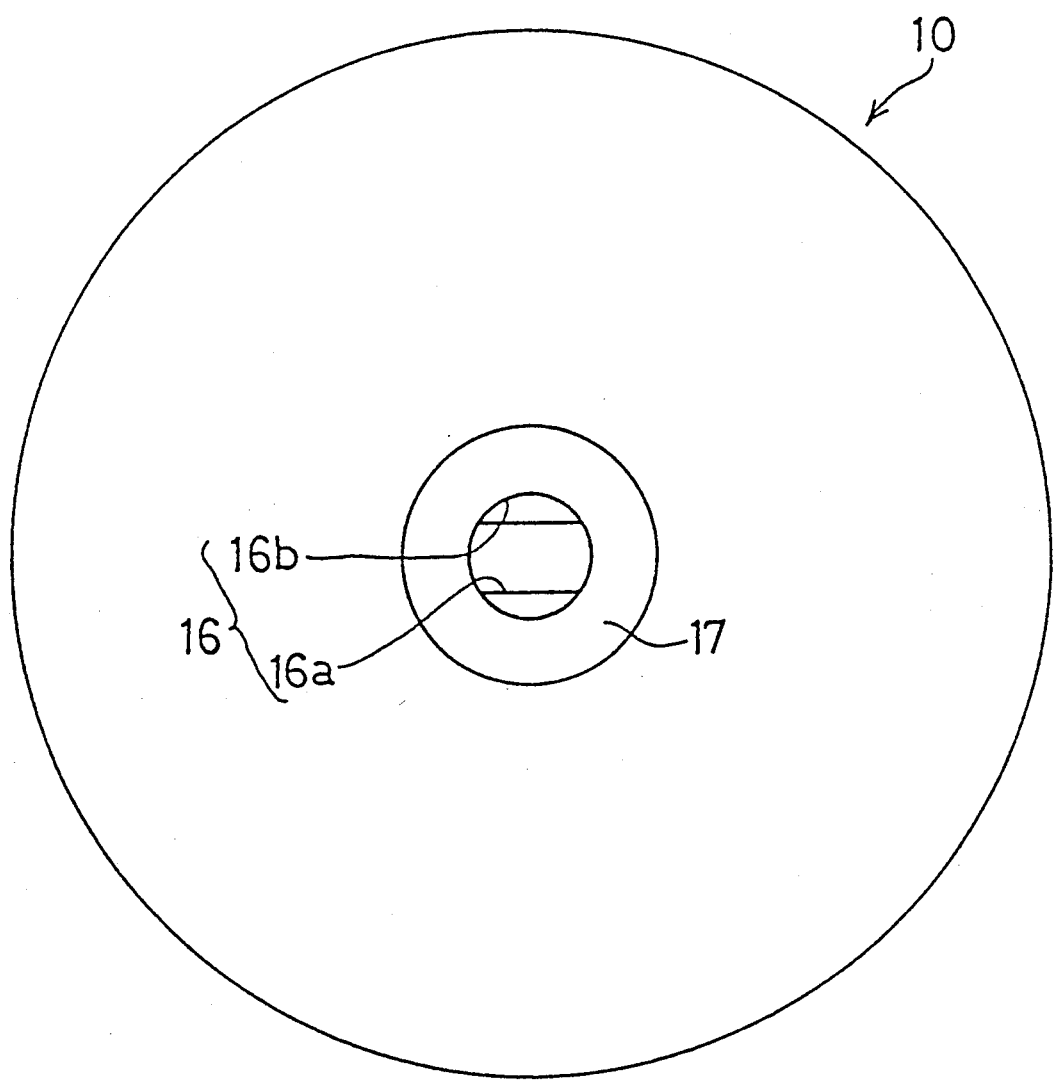
FIG. 2 is a front view of the flange of FIG. 1.

A cylindrical member 17 is disposed protruding from the center of the body 11 at the side provided with the abutting portion 13. A hole 16 passes through the centers of the cylindrical member 17 and the body 11. The hole 16 has an inside portion 16a passinq through the body 11 and an outside portion 16b passing through the cylindrical member 17. As shown in FIG. 2, the portion 16a in the body 11 has an oblong cross section with opposite rounded ends (hereinafter referred to simply as "oblong cross section") and the portion 16b in the cylindrical member 17 has a perfectly circular cross section.

Figure 3:
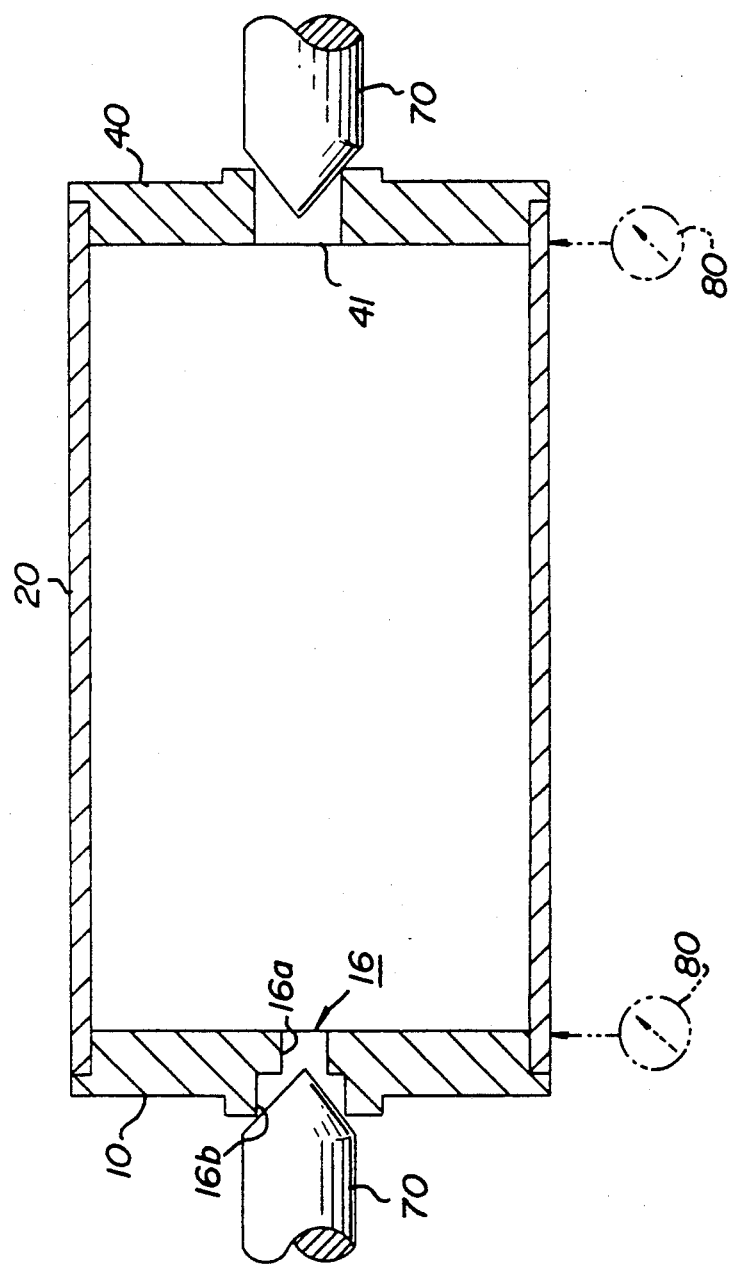
FIGS. 3 and 4 are schematic diagrams showing operations of the flange of FIG. 1.

As shown in FIG. 3, the flange 10 having the above construction is mounted with its outer wall 12 pressed into one end of the photoconductor drum 20, so that it can rotate together with the photoconductor drum 20. Mounted on the other end of the photoconductor drum 20 is a flange 40. The flange 40 is a conventional flange having a hole 41 through which the end portion of a rotation shaft 30 having a perfectly circular cross section is to be inserted.

As described above, with the flanges 10 and 40 mounted on the respective ends, the photoconductor drum 20 is measured for its eccentricity for rotation, i.e., the photoconductor drum 20 is tested for concentricity with respect to the holes 16 and 41 of the flanges 10 and 40. A pair of rotation pins 70 each having a conical tip are used when measuring the eccentricity. One of the rotation pins 70 is inserted into the perfectly circular portion 16b passing through the cylindrical member 17 of the flange 10, the rotation pin 70 tightly contacting the outer rim of the perfectly circular portion 16b. The other rotation pin 70 is inserted into the perfectly circular hole 41 of the flange 40, the rotation pin 70 tightly contacting the outer rim of the hole 41. In this situation, when the rotation pins 70 are rotated, the flanges 10 and 40 rotate concentrically with, and together with the rotation pins 70 because the conical tips of the rotation pins 70 firmly contact the respective outer rims of the perfectly circular holes 16b and 41 of the flanges 10 and 40. Accordingly, the photoconductor drum 20 with the flanges 10 and 40 mounted thereon is made to rotate. In the meantime, a dial gauge 80 is placed in contact with a non-image area on each end of the outer circumferential surface of the photoconductor drum 20 to measure the eccentricity of the photoconductor drum 20 for rotation.

Figure 4:
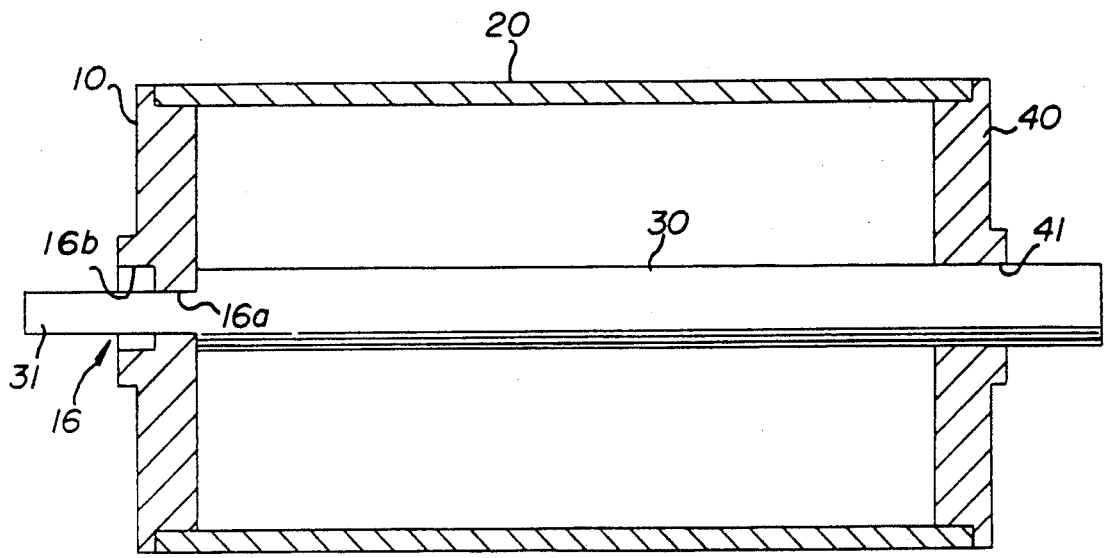
Figure 5:
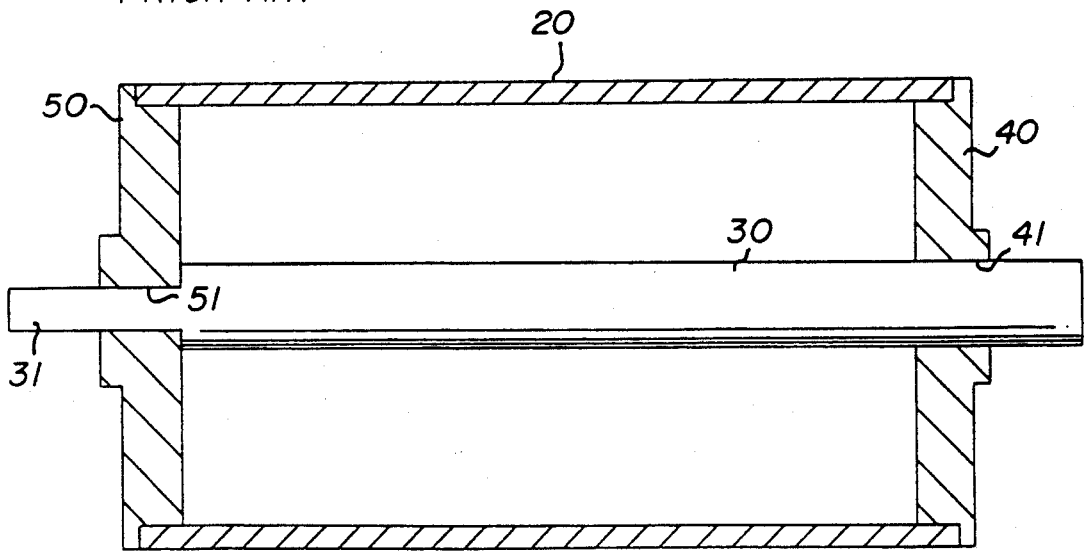
FIG. 5 is a sectional view of a conventional flange for a drum when mounted on the drum.

In this way, the photoconductor drum 20 is inspected for concentricity with respect to the holes 16 and 41 of the flanges 10 and 40 mounted on the ends of the photoconductor drum 20. After the concentricity is verified, the photoconductor drum 20 is mounted on the rotation shaft 30, as shown in FIG. 4. An end portion 31 of the rotation shaft 30 has its sides cut off to match the oblong cross section of the portion 16a of the flange 10. To insert the rotation shaft 30, the side-cut end portion 31 is first passed through the hole 41 of the flange 40 and then inserted into the oblong portion 16a of the hole 16 formed in the flange 10 of the present invention. The side-cut end portion 31 of the rotation shaft 30 further passes through the perfectly circular portion 16b of the hole 16 to extend outwardly from the flange 10. The other end portion of the rotation shaft 30 is positioned extending through the hole 41 of the flange 40 mounted on the photoconductor drum 20. In this condition, the rotation shaft 30 is mounted in a predetermined position in the image forming apparatus, where the rotation shaft 30 is rotated, which in turn rotates the photoconductor drum 20.

As described above, the flange for a drum of the present invention has a hole passing therethrough along the axis of rotation, and the portion of the hole to be located toward the inside of the drum has an oblong cross section while the portion of the hole to be located toward the outside has a perfectly circular cross section. Thus, the flange is surely rotated together with the rotation shaft since the end portion of the rotation shaft with an oblong cross section is firmly fitted into the oblong portion of the hole. Also, into the perfectly circular portion of the hole, a conical rotation pin is concentrically and firmly fitted. Therefore, while the flange of this invention and another flange having a perfectly circular hole therethrough are mounted on the respective ends of the photoconductor drum, both the flanges are concentrically and securely supported on a pair of conical rotation pins and thus can be rotated concentrically with, and together with the rotation pins. Thus, with the flanges mounted on the respective ends, the eccentricity of the photoconductor drum for rotation can be accurately measured.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A flange for a photoconductor drum, which has a hole coaxially formed therein and passing therethrough to receive a rotation shaft therethrough, said flange being mounted on one end of said photoconductor drum so that the rotation shaft and the photoconductor drum have a common rotation axis, thereby allowing rotation of the rotation shaft to be transmitted to the photoconductor drum, wherein said hole includes an inside portion having a substantially oval cross section and an outside portion having a perfectly circular cross section, said inside portion being located toward the photoconductor drum, and said outside portion being open away from the photoconductor drum.

2. A flange according to claim 1, wherein said outside portion of said hole with a perfectly circular cross section receives a tip portion of a conical rotation pin, thereby allowing the rotation of said conical rotation pin to be transmitted to said flange.

3. A flange according to claim 1, wherein one end portion of said rotation shaft is coaxially fitted into and passes through said inside portion of said hole to allow the rotation of said rotation shaft to be transmitted to said flange, said one end portion of said rotation shaft having the same cross section as that of said inside portion.

4. A photoconductor drum unit comprising:
a photoconductor drum having two ends, which is disposed in an image forming apparatus and rotates to allow an image to be formed on a circumferential surface thereof,
flanges mounted on the ends of said photoconductor drum, wherein each of said flanges has a hole coaxially formed therein and passing therethrough, the hole and the photoconductor drum having a common rotation axis, and
a rotation shaft mounted in the image-forming apparatus, with the end portions of said rotation shaft respectively passing through the holes of said flanges so as to allow the rotation of said rotation shaft to be transmitted to said flanges;
wherein the hole of one of said flanges has an inside portion having a substantially oval cross section and an outside portion having a perfectly circular cross section, said inside portion being located toward said photoconductor drum while said outside portion is open away form said photoconductor drum, and one of said end portions of said rotation shaft has the same cross section as that of said inside portion, so as to be coaxially fitted into said inside portion of the hole.

5. A photoconductor drum unit according to claim 4, wherein the hole of the flange other than the flange having the inside and outside portions has a perfectly circular section with a predetermined diameter therethrough.

6. A photoconductor drum unit according to claim 4, wherein each of said flanges further includes conductive portions electrically connected to the inner surface of said photoconductor drum.

* * * * *